May 26, 1942.　　　L. A. YODER　　　2,284,315
WELDING APPARATUS
Filed Dec. 6, 1941　　　2 Sheets-Sheet 1

INVENTOR
Leonard A. Yoder
BY
Geo. B. Pitts
ATTORNEY

May 26, 1942.    L. A. YODER    2,284,315
WELDING APPARATUS
Filed Dec. 6, 1941    2 Sheets-Sheet 2

INVENTOR
Leonard A. Yoder
BY Geo. B. Pitts
ATTORNEY

Patented May 26, 1942

2,284,315

UNITED STATES PATENT OFFICE 2,284,315

WELDING APPARATUS

Leonard A. Yoder, Lakewood, Ohio, assignor to The Yoder Company, Cleveland, Ohio, a corporation of Ohio Application December 6, 1941, Serial No. 421,889

8 Claims. (Cl. 219—6)

This invention relates to welding apparatus of the resistance type, wherein the welding electrodes and the transformer for supplying current to the electrodes are connected together, both electrically and mechanically, and mounted for rotation as a unit. As illustrating one application of the invention, the work consists of pipe, the butting seam of which is to be welded.

One object of the invention is to provide, in apparatus of this type employing a standard form of transformer, an improved mounting consisting of a frame, in which the transformer is supported, carrying outwardly of one end thereof the electrodes for engagement with the work and spaced bearings for the frame, whereby the transformer and electrodes may be rotated as a unit.

In this arrangement, the electrodes are closely related to the terminals of the secondary winding of the transformer, current losses are reduced and electrodes of relatively small diameter may be used.

Another object of the invention is to provide in apparatus of this type an improved mounting of simplified construction for rotatably supporting the transformer and electrodes, whereby these parts may be readily rotated by the work.

Other objects of the invention will be apparent to those skilled in the art to which my invention relates from the following description taken in connection with the accompanying drawings, wherein—

Figure 1:
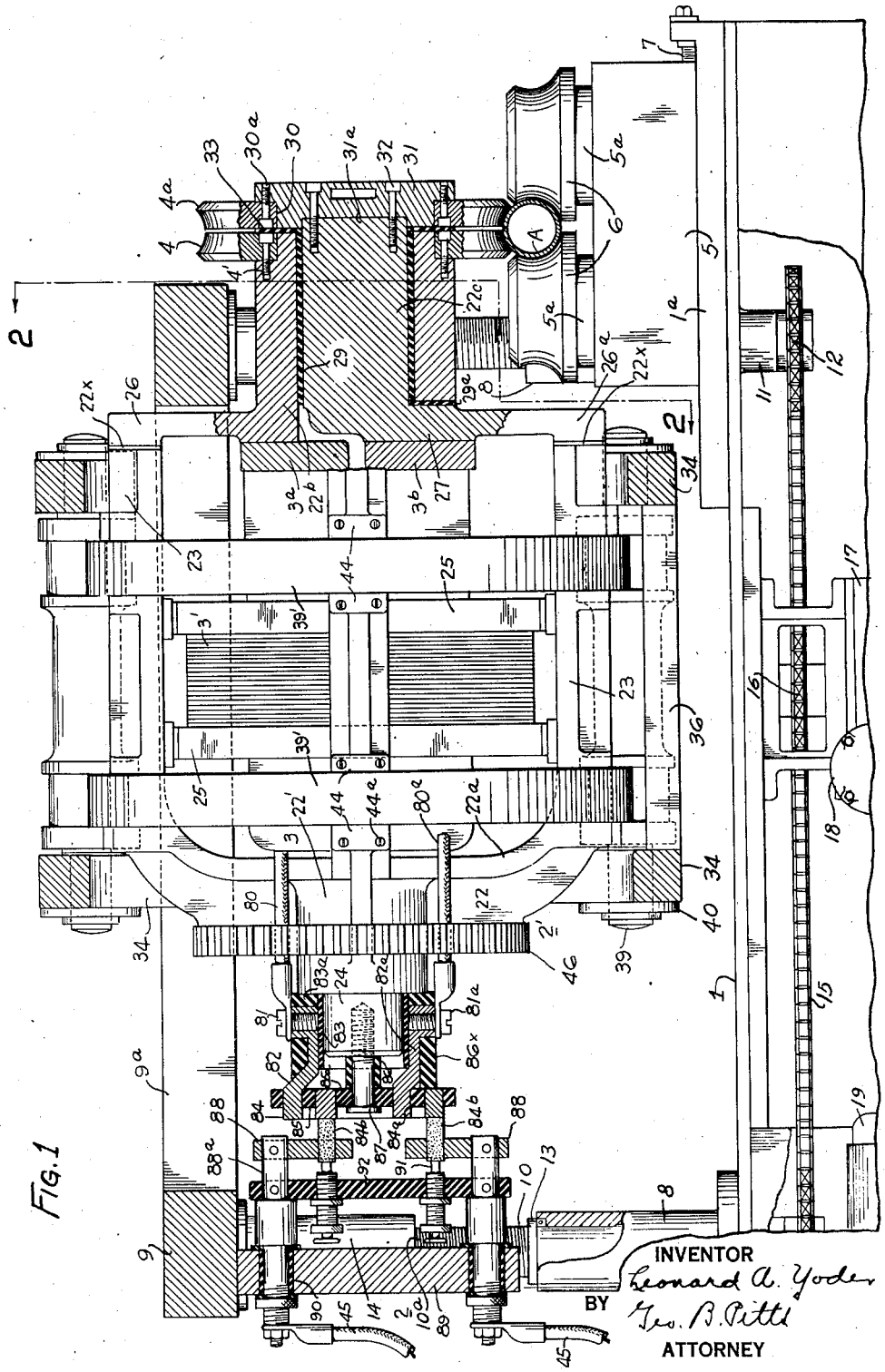
Fig. 1 is a view, partly in side elevation and partly in section, of a welding apparatus embodying my invention.
Figure 2:
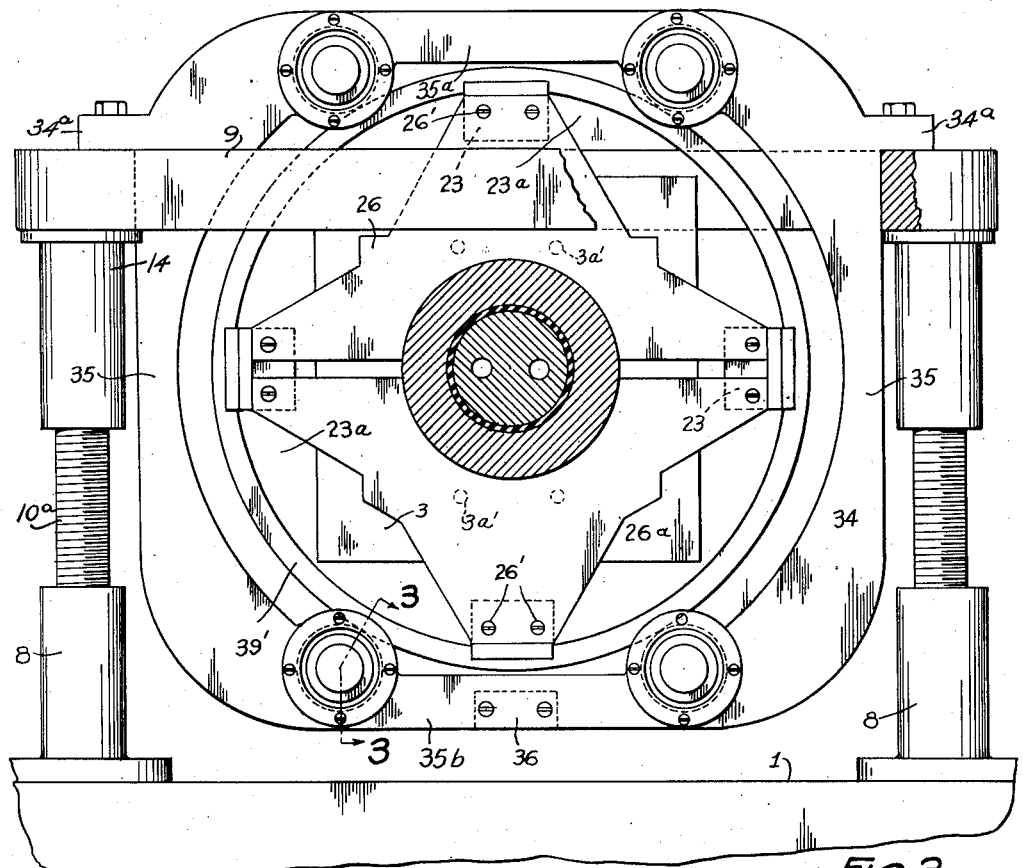
Fig. 2 is a section on the line 2—2 of Fig. 1.
Figure 3:
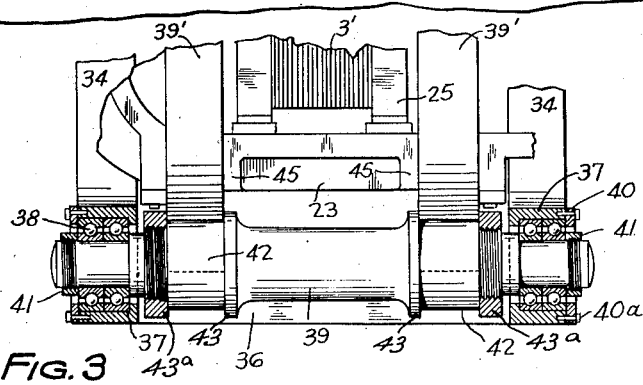
Fig. 3 is a fragmentary view on the line 3—3 of Fig. 2.

In the drawings, 1 indicates as an entirety a frame of any desired construction forming a supporting member for a supporting means, indicated as an entirety at 2, on which a transformer 3 and its mounting (the latter being indicated as an entirety at 2'), are positioned. The transformer 3 comprises a core 3', primary windings and secondary windings having terminals 3a, 3b, connected to electrodes 4, 4a, in the manner later set forth. The frame 1 also provides a bed 1a for a casing 5 arranged to house suitable supporting means (not shown) for shafts 5a which are provided with work supporting and guide devices 6, the latter being illustrated as rolls rotatable on the shafts 5a and adapted to engage pipe A the seam of which is to be welded. The rolls 6 may be secured to the shafts 5a and the latter driven by means (not shown) within the casing 5. The rolls 6 are removable, whereby they may be replaced by other rolls dependent upon the size of the pipe to be welded. The casing 5 is adjustable on the bed 1a transversely to the direction of feed of the pipe A by means of a screw 7. The mechanism for delivering the pipe A to the rolls 6 is not shown as it forms no part of the present invention.

Of the supporting means 2, 8 indicates a plurality of upright members (preferably four in number) suitably fixed to the top wall of the frame 1 and arranged to support thereabove a separate frame 9 preferably of substantially rectangular shape, whereby portions of the mounting 2' and transformer 3 may be positioned within the frame to reduce the overall height of the apparatus. For reasons later set forth, the frame 9 is adjustable vertically on the members 8 by the following instrumentalities: 10 indicates a shaft extending through each member 8, which is provided with suitable bearings therefor, and a hollow boss 11, provided on the lower side of the top wall of the frame 1. Each shaft 10 is provided on its lower end with a sprocket 12 for a purpose later set forth and intermediate its ends it is provided with a collar 13 adapted to engage the upper bearing (which is preferably adapted to take thrusts) in the adjacent member 8. The upper portions of the shafts 10 are provided with screw threads 10a which engage threads on the inner walls of tubular members 14, one for each shaft 10, fixed to and depending from the frame 9, the members 14 serving as nuts so that when the shafts 10 are rotated the frame 9 is raised or lowered according to the direction of rotation of the shafts. The shafts 10 are rotated simultaneously in the same direction preferably by means of an endless chain 15 engaging a driven sprocket 16 fixed to a shaft, which is mounted in the walls of a gear box 17, and drivingly connected through a suitable gear reduction within a casing 18 to the shaft of a motor 19.

The mounting 2' consists of a member 22 rotatably mounted as later set forth and comprising three sections 22a, 22b and 22c, the transformer 3 being secured to and mounted within the section 22a and the sections 22b, 22c, being connected to but insulated from the section 22a, as shown at 22x, and forming the conductors from the terminals 3a, 3b of the secondary windings to the electrodes 4, 4a, respectively. The section 22a preferably consists of a cage-like device having a plurality of arms or bars 23 integrally connected at one end, that end remote from the electrodes 4, 4a, to a hub 22'. The hub 22' is rigidly connected to an extension 24, and disposed in line with an imaginary center about which the arms 23 are positioned and in axial alinement with the axes of the electrodes 4, 4a. The section 22a is preferably provided with four uniformly spaced arms 23, the core 3' of the transformer being rigidly secured by suitable devices 25 to one or more of the arms 23. The sections 22b, 22c, preferably consist of outer and inner concentrically related devices provided at their inner ends with oppositely disposed, radially extending plates 26, 26a, respectively, each rigidly connected at their outer ends (preferably by countersunk screws 26') to the outer ends of the arms 23, whereby the sections, which form the member 22, are rigidly connected together. The plates 26, 26a, are provided with pads 27 which are rigidly secured to the terminals 3a, 3b, respectively, by cap screws 3a' to form an electrical contact therewith. As the devices 22b, 22c, are formed of conducting material (such as copper), the current flows from the terminals to the electrodes 4, 4a. Each plate 26, 26a, is insulated from the adjacent arm 23 by insulation material 22x, as already set forth. Likewise, the bolts 26' are suitably insulated from the plates 26, 26a, and the adjacent parts. A sleeve 29 of insulation material is interposed between the conductor devices 22b, 22c; also a section 29a of insulation material is interposed between the inner end of the conductor device 22b and the plate 26a.

The outer end portion of the conductor device 22b is reduced to form a seat for the inner peripheral portion of the electrode 4 which is secured to the device by screws 4'. The inner peripheral portion of the electrode 4a fits an annular seat 30 formed in a cap 31, formed of conducting material, such as copper, and is secured to the latter by screws 30a and the inner wall of the cap is centrally recessed at 31a to fit over the outer end of the conductor device 22c, to which the cap is secured by screws 32. A ring 33 formed of insulation material is positioned between the electrodes 4, 4a, and adjacent portions of the conductor device 22b and cap 31. By means of the engagement of the electrode 4 with the conductor device 22b and the electrode 4a through the cap 31 with the conductor device 22c, the electrodes have direct electrical connections with the terminals 3a, so that loss of current is reduced to a minimum.

The electrical connections to the primary windings of the transformer comprise the following: 80, 80a, indicate leads leading from the windings to terminals 81, 81a, which are mounted in conductors 82, 82a, respectively, diametrically disposed on the outer end portion of the extension 24, which extends outwardly from the hub 22' of the member 22. The conductors 82, 82a, are insulated from each other by suitable insulation material 86x and from the extension 24 by a sleeve of insulation material 83 and from the hub 22' by an annulus formed of insulation material 83a. The conductors 82, 82a, extend longitudinally of the extension 24 and terminate at their outer ends in rings 84, 84a, respectively, which operate to collect the current from brushes 84b. As shown in Fig. 1, the ring 84a is of a size to fit within and in spaced concentric relation to the ring 84. A collar 85 formed of insulation material serves as a spacer between the rings and a disk 85a of insulation material is mounted within the ring 84a, the disk being secured, through a collar 86, to the extension by a screw 87, to insure a fixed relation between the rings 84, 84a, as they rotate. Each of the brushes 84b is slidably mounted in a bar 88 formed of suitable conducting material and carried on the inner end of a terminal 88a, the outer end portion of which extends through and is mounted in an opening formed in a bracket 89 depending from the frame 9. Each terminal is connected to a lead 45. Each terminal 88a is insulated from the wall of its supporting opening by a sleeve 90 formed of insulation material. Each brush 84a is acted upon by a spring operated plunger 91, the casing for the plunger and its spring being threaded into an opening formed in a section 92 formed of insulation material and supported by the inner end portions of the terminals 88a.

The parts above described are substantially similar to like parts shown in and form the subject-matter of the copending application of Howard I. Morris, of Lakewood, Ohio, Serial No. 321,745, filed March 1, 1940, for which reason no claim is made herein to such parts and the mounting thereof broadly for rotation, except in combination the rotatably supporting means consisting of the following instrumentalities: 34 indicates a pair of spaced supporting elements each having at its upper ends outwardly extending lugs 34a rigidly secured to the side members 9a of the frame 9 and depending therefrom. As shown, each of the supporting elements 34 consists of side walls 35, and a top wall 35a and a bottom 35b, which walls, by preference, are integrally connected and surround the transformer 3 and frame section 22a, the bottom walls 35b being spacedly connected by a bar 36 to insure the parallel relation of the supporting elements 34. Each top wall 35a and each bottom wall 35b of the supporting elements 34 is shaped to form a pair of spaced seats 37, for suitable anti-friction bearings 38, the axes of which are parallel to the axes of the electrodes 4, 4a.

As will be understood, each bearing 38 on each supporting element 34 is in alinement with the correspondingly positioned bearing 38 on the other supporting element, each two alined bearings 38 serving to support the opposite ends of a shaft 39.

As will also be understood, the shafts 39 are disposed equal distances from the aforesaid center axially related to the axes of the electrodes 4, 4a, and are engaged by a pair of spaced rings 39' secured to the arms 23 as later set forth.

Each bearing 38 preferably consists of two sets of ball bearings, in side by side relation. The outer race for the inner set of bearings is in engagement with the inner side wall of the adjacent seat 37 and the inner race thereof is in engagement with a shoulder formed by the adjacent reduced end of the shaft 39, whereas the outer race of the outer set of bearings is held in engagement with the outer race of the inner set of bearings by a ring 40 secured to the adjacent supporting element 34 by screws 40a and the inner race of the outer set of bearings is held in engagement with the inner race of the inner set of bearings by a nut 41 threaded on the outer end portion of the adjacent shaft 39.

In the form of construction shown, the shafts 39 are free to turn in their bearings 38 and are provided with surfaces 42 on which the rings 39' rotate to rotatably support the transformer 3, frame member 22 and electrodes 4, 4a', but it will be obvious that the shafts 39 may be fixedly supported in the supporting elements 34 and each provided with freely rotatable flanged rollers to rotatably engage and support the rings 39' and parts connected thereto. Each shaft 39 at the opposite ends of each ring engaging surface 42, is provided with collars 43, 43a, spaced to engage the opposite sides of the adjacent ring 39', so as to guide the ring while rotating and thus prevent movement by the member 22 and electrodes laterally in either direction axially of the latter. The collars 43 are preferably formed integrally with the shaft 39 and engage the inner sides of the rings 39', whereas the collars 43a constitute rings threaded on the shft 39 and arranged to engage the outer sides of the rings. The collars 43a may be secured in position in any desired manner. While it is obvious that the weight of the frame member 22 and electrodes 4, 4a, are carried on the shafts 39, which are supported on the bottom walls 35b of the supporting elements 34, the engagement of the shafts 39 carried by the top walls 35a serve to maintain the rings 39' on the shafts 39 carried by the bottom walls 35b and the electrodes 4, 4a, in engagement with the work A. Each ring 39' is provided on its opposite sides with pairs of lugs 44 which are uniformly spaced therearound and secured by countersunk screws 44a to spaced lugs 45 provided on the arms 23 of the member 22a.

As hereinbefore set forth, the member 22 is rotated by the engagement of the moving work with the electrodes 4, 4a, but these parts may be positively rotated by a suitable driving mechanism such as shown in the aforesaid co-pending application of Howard I. Morris, such mechanism being connected to the gear 46, which is suitably fixed to the hub 22'. Such driving mechanism may also be employed for rotating the electrodes 4, 4a, when the latter are to be re-ground.

It will be noted that since the shafts 39 are carried by the supporting elements 34 and the latter are carried by the frame 9, the vertical adjustment frame 9 to effect the necessary engagement of the electrodes 4, 4a, with the work A to effect welding of the latter and rotation of the electrodes serves also to adjust the shafts 39 to maintain the member 22 and its rotatable supporting means in assembled relation.

From the foregoing description it will be noted that the shafts 39 carried by the bottom walls of the supporting elements 34 are disposed parallel to the imaginary center or line axially related to the axes of the electrodes 4, 4a, and upon opposite sides of a radius struck from said center or line. In this arrangement these shafts form a cradle on which the unitary assembled parts rotate.

It will also be noted that by eliminating bearings between the electrodes 4, 4a, and frame section 22a or outwardly of the electrodes, the electrodes may be positioned in close relation to the transformer, thereby reducing current losses; also, as the electrodes may be freely adjusted for engagement with the work electrodes of small diameter may be advantageously employed and work engaging rolls of varying sizes may be used.

To those skilled in the art to which my invention relates many changes in construction and widely differing embodiments and applications of the invention will suggest themselves without departing from the spirit and scope of the invention. My disclosures and the description herein are purely illustrative and are not to be in any sense limiting.

What I claim is:

1. In welding apparatus, the combination with a support and a unitary mechanism comprising a frame consisting of a main section and separate sections axially related to said main section and rigidly connected at their inner ends thereto, electrodes carried by said separate sections, respectively, and a transformer carried by said main frame section and having the terminals of its secondary winding electrically connected to said electrodes, of spaced pairs of bearings between said support and said main frame section disposed parallel to the common axis of said electrodes and upon opposite sides of the vertical axial plane, for rotatably supporting said unitary mechanism, and current supply means connected to the primary winding of said transformer.

2. A welding apparatus as claimed in claim 1, wherein the spaced pairs of bearings consist of shafts rotatably mounted on said support and spaced rings fixed to said main frame section engage said shafts.

3. A welding apparatus as claimed in claim 1, wherein the spaced pairs of bearings consist of shafts mounted on said support and rings fixed to said main frame section engage said shafts, each of said shafts being provided with spaced collars to engage the opposite sides of one of said rings to prevent movement of said unitary mechanism axially of the said electrodes.

4. A welding apparatus as claimed in claim 1, wherein the spaced pairs of bearings consist of shafts mounted on said support and rings fixed to said main frame section engage said shafts, and means are provided on said support in engagement with said rings for holding them in rolling engagement with said shafts.

5. In welding apparatus, the combination with a support and a unitary mechanism comprising a frame consisting of a main section and separate sections axially related to said main section and rigidly connected at their inner ends thereto, electrodes carried by said separate sections, respectively, and a transformer carried by said main frame section and having the terminals of its secondary winding electrically connected to said electrodes, of a pair of spaced supporting elements disposed transversely to said mechanism and shaped to surround the main section of said frame, a pair of shafts supported at their opposite ends in said elements in spaced relation at opposite sides of the vertical plane of the axes of said electrodes, a pair of spaced rings fixed to said main frame section and having engagement with said shafts for rotatably supporting said mechanism, and means for supplying current to the primary winding of said transformer.

6. In welding apparatus, the combination with a support and a unitary mechanism comprising a frame consisting of a main section and separate sections axially related to said main section and rigidly connected at their inner ends thereto, electrodes carried by said separate sections, respectively, and a transformer carried by said main frame section and having the terminals of its secondary winding electrically connected to said electrodes, of a pair of spaced, parallelly related supporting elements on said support disposed transversely to said mechanism and shaped to form side, top and bottom walls surrounding said mechanism, a pair of shafts supported at their opposite ends in the bottom walls of said elements in spaced relation at opposite sides of the vertical plane of the axes of said electrodes, a pair of shafts supported at their opposite ends in the top walls of said elements in spaced relation at opposite sides of the vertical plane of the axes of said electrodes, spaced rings fixed to said main frame section engaging said pairs of shafts, for rotatably supporting said mechanism, and means for supplying current to the primary winding of said transformer.

7. In welding apparatus, the combination with a support, of a separate support adjustably mounted thereon, a unitary mechanism comprising a frame consisting of a main section and separate sections axially related to said main section and rigidly connected at their inner ends thereto, electrodes carried by said separate sections, respectively, and a transformer carried by said main frame section and having the terminals of its secondary winding electrically connected to said electrodes, spaced pair of bearings between said separate support and said main frame section disposed parallel to the axes of said electrodes and upon opposite sides of the vertical plane of said axes, means for adjusting said separate support, and means for supplying current to the primary winding of said transformer.

8. In welding apparatus, the combination with a support, of a frame, a transformer mounted in said frame, a pair of electrodes, means for supporting said electrodes on one end of said frame, said electrodes being electrically connected to the terminals of the secondary winding of said transformer and electrically insulated from said frame, spaced pairs of bearings between said support and said frame disposed parallel to the axes of said electrodes and upon opposite sides of the vertical plane of said axes, and means for supplying current to the primary winding of said transformer.

LEONARD A. YODER.